Figure 1:
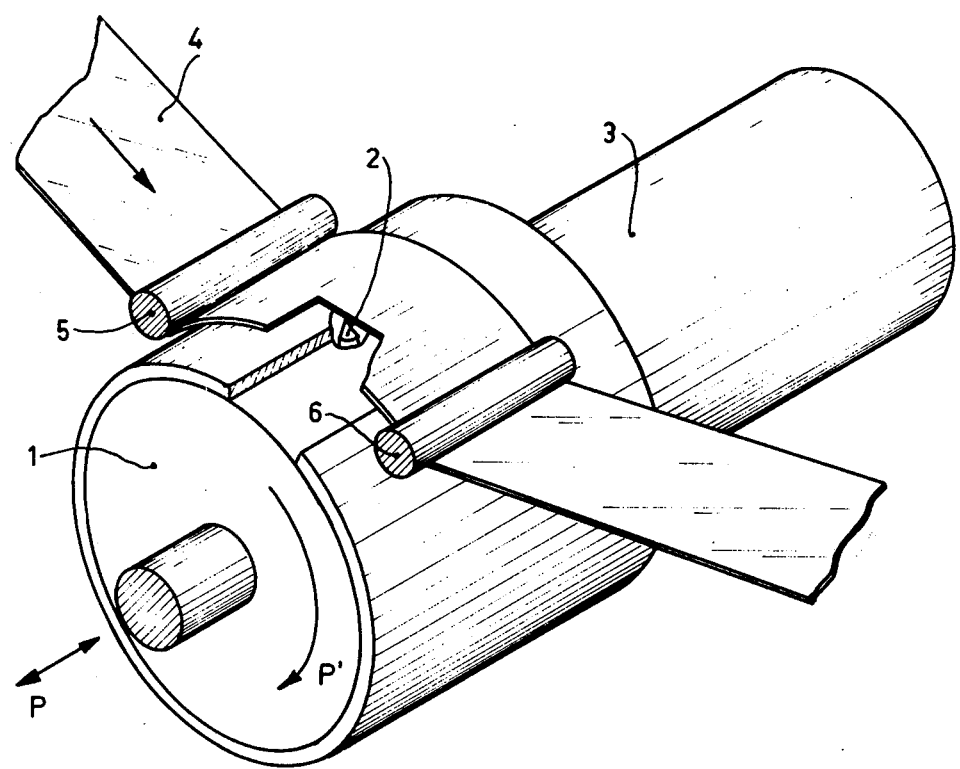

United States Patent [19]

Jost et al.

[11] 4,028,711

[45] June 7, 1977

[54] METHOD OF AND DEVICE FOR ELECTROSTATIC PRINTING

[75] Inventors: Gerhard Jost; Ulf Rothgordt, both of Norderstedt; Klaus Witter, Hamburg, all of Germany

[73] Assignee: U.S. Philips Corporation, New York, N.Y.

[22] Filed: Apr. 2, 1975

[21] Appl. No.: 564,305

[30] Foreign Application Priority Data

Apr. 18, 1974 Germany ............................ 2418632

[52] U.S. Cl. .............................. 346/153; 346/156; 358/127
[51] Int. Cl.² .............. G03G 13/044; G03G 13/052
[58] Field of Search ..... 346/74 ES, 74 EW, 74 EK, 346/74 J, 74 EH, 139 C; 178/6.6 A

[56] References Cited

UNITED STATES PATENTS

| 3,184,749 | 5/1965 | Groth | 346/74 EW |
| 3,329,961 | 7/1967 | Schwertz | 346/74 EW |
| 3,349,702 | 10/1967 | Nesin | 346/74 EW |
| 3,380,069 | 4/1968 | Hojo | 346/74 EH |
| 3,383,697 | 5/1968 | Rice | 346/74 ES |
| 3,414,723 | 12/1968 | Pleitt | 346/74 EW |
| 3,417,404 | 12/1962 | Macovski | 346/74 EW |

*Primary Examiner*—Jay P. Lucas
*Attorney, Agent, or Firm*—Frank R. Trifari; Robert S. Smith

[57] ABSTRACT

An electrostatic printer having electrodes which each are constructed as a needle arranged on a rotatable drum mounted for translatory movements. At the recording area the needle slides directly over the paper under pressure to cause the paper to be slightly pushed away. The width of the recorded track is identified by the contact surface area of the needle.

10 Claims, 6 Drawing Figures

METHOD OF AND DEVICE FOR ELECTROSTATIC PRINTING

The invention relates to a method of electrostatically printing alphanumerical or facsimile characters, in which controllable pulses are applied during the relative movement between an electrode device and a record carrier, and furthermore relates to a device for performing the said method.

Electrostatic recording methods are known which are used, for example, for fast and quiet printers, for curve recorders or for facsimile apparatus. The principles applied thus far usually utilize electrode devices which maintain a comparatively loose contact with the record carrier in the form of a special paper provided with a thin electrically insulating cover layer. By applying a sufficiently high voltage to the electrode device or parts thereof, an electric gas discharge can be ignited between these electrodes and the record carrier surface, the said gas discharge producing an image-like electrical charging of the insulating layer of the special paper. A subsequent developing stage, during which fine toner particles are applied to the record carrier which adhere only to the charged areas, produces a visible image. Due to the properties of an electrical gas discharge, the achievable resolution of such a reproduction method cannot by arbitrarily increased. The air gap between the electrode and the record carrier surface, necessary for the gas discharge, always gives rise to a charge image which has been enlarged in a sense with respect to the electrode section. The smallest charge point diameters achievable using such a method amount to some tens to some hundreds of micrometers.

It is a further drawback of such known devices that the transferred quantity of charge cannot be predetermined but is determined by the instantaneous, possibly fluctuating record carrier properties and electrode configurations. Because the deposited quantity of toner particles is a function of the quantity of charge transferred, controllable reproduction of various shape of grey cannot be ensured by such a method.

The present invention has for its object to provide a method and a device which enable a substantially higher resolution to be realized and which are hence suitable for electrostatic microrecording, and which also make the extent of the charging of a record carrier variable in a readily controllable manner.

This object is achieved by electrodes which slide directly over the surface of the record carrier under pressure. The charge density applied to the record carrier is linearly dependent on the voltage applied to the electrodes and the electrodes are constructed as needles whose area of contact with the record carrier determines the width of the recorded track. The electrodes preferably contact the record carrier under a pressure such that the latter is slightly pushed away, without being hampered by a backing. If necessary, an anvil can be used in the form of a very flexible supporting layer, for example, in the form of a liquid surface.

In comparison with the known method and with known devices for electrostatic recording, the proposed method offers important advantages.

An electrode which is periodically moved line-wise over the special record carrier and which is constructed as a needle can produce a higher-resolution electrostatic charge image by controlled electrical pulses. Due to the absence of a gas discharge, absolutely necessary in the known devices, the minimum size of the chargeable areas is determined only by the area between electrode needle and record carrier which is directly contacted during a single pulse. For a contact area of the needle having a diameter of, for example, $5\mu m$, a line having a width of only $5\mu m$ can be recorded. By application of sufficiently short pulses, this line can be divided into pieces having a length which is even smaller than the diameter, because at the instant of interruption of the applied voltage, an electrical discharge of the area still contacted by the electrode needle takes place. The value of the charge is then governed only by the value of the applied voltage, and is even directly proportional thereto. In conjunction with known developing methods for making electrostatic charge images visible, an image can thus be produced comprising various areas of different density.

It is a further advantage of this method that there are no transfer delays (delayed ignitions) such as occur in principle in recordings produced by gas discharges.

The invention will be described in detail hereinafter with reference to an embodiment according to the invention which is shown in the Figures.

Figure 2:
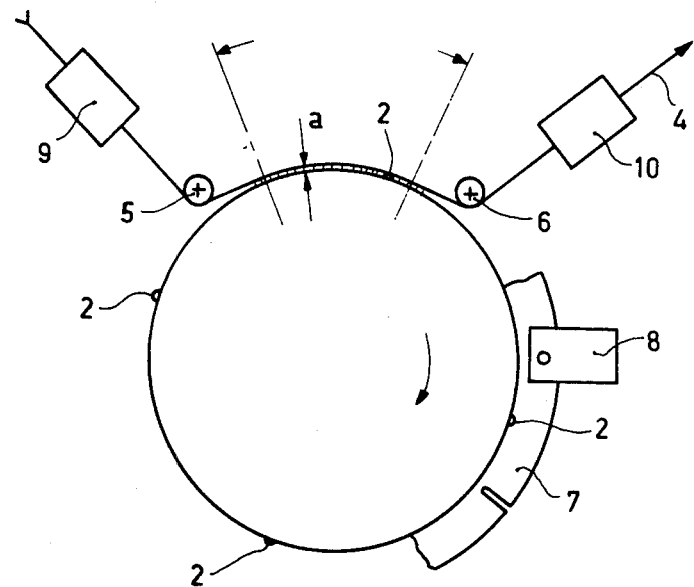
Figure 3:
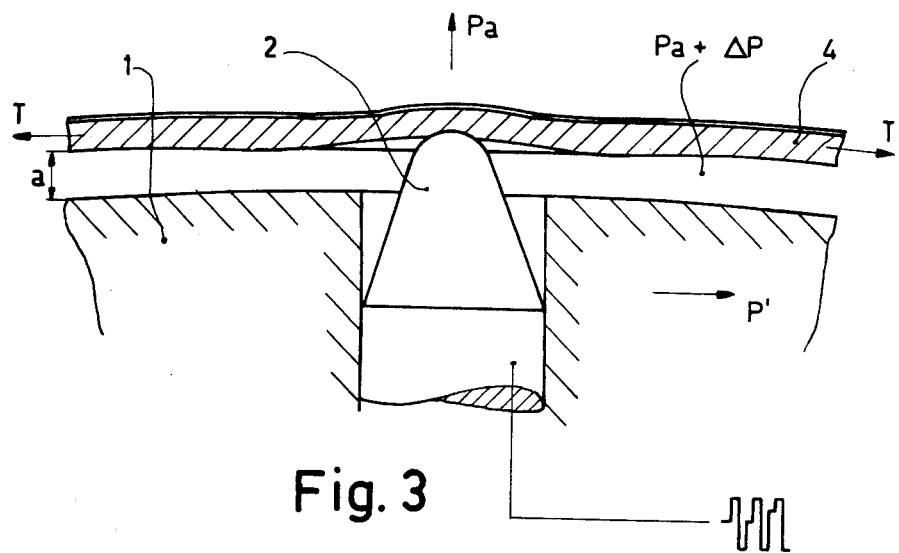
Figure 4:
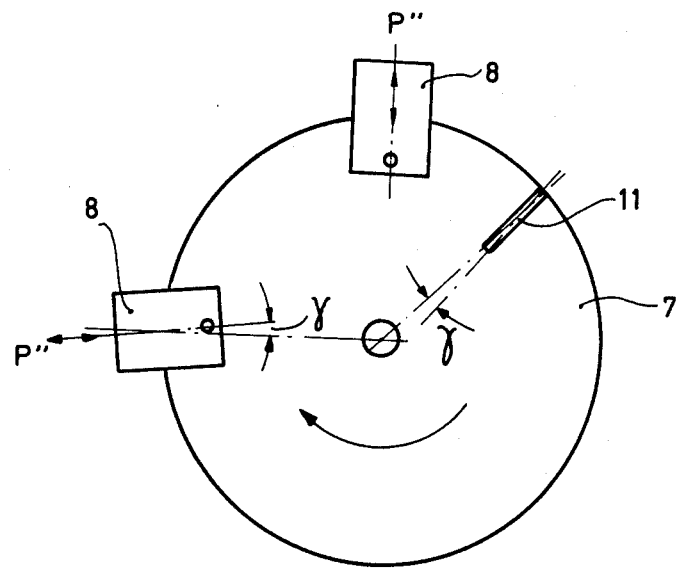
Figure 5:
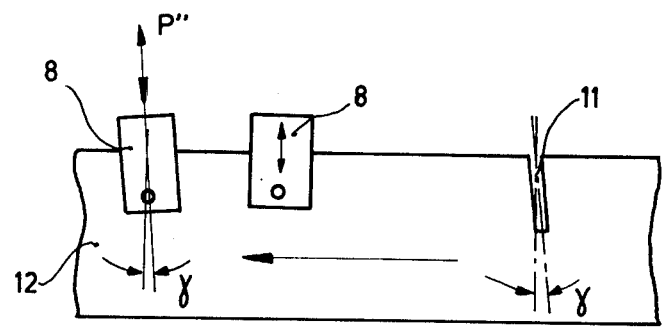
Figure 6:
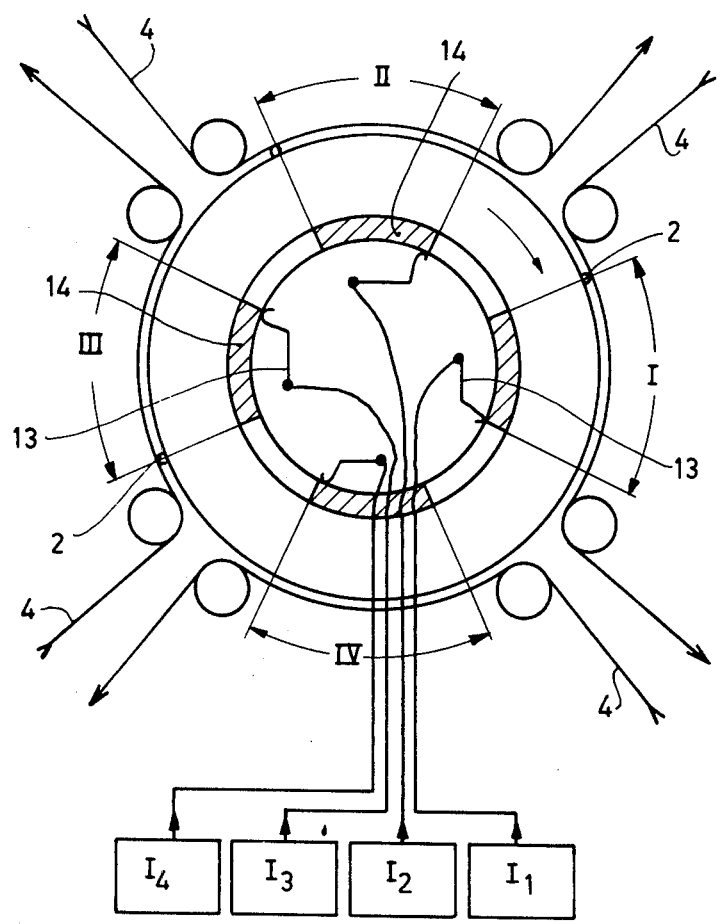

FIG. 1 is a perspective view of a device for performing the method according to the invention, FIG. 2 is a sectional view of the device of FIG. 1, FIG. 3 shows the recording site of the device of FIG. 1 at an increased scale, FIGS. 4 and 5 show two examples of a synchronization disc with adjustment facilities intended for the device of FIG. 1, and FIG. 6 shows a device according to FIG. 1 for the simultaneous printing on various record carriers.

The device shown comprises a rotating cylinder 1 which has a diameter of 60 mm. In this cylinder 1 there is provided an electrode needle 2 which is insulated with respect to the cylinder and which receives an electrical signal for the recording. The electrode needle 2 is adjusted such that its tip projects approximately $100\mu m$ from the surface of the cylinder 1.

For the recording material a unilaterally metalized mylar foil is used. This recording foil 4 is partly wrapped about the cylinder 1. The wrapping angle is determined by guide rollers 5 and 6. The wrapping angle can be varied between 20° and 80° by displacement of the guide rollers. The record carrier 4 remains in a stationary position during the recording.

Due to the rotation P' of the cylinder 1, the electrode needle 2 produces a recording on the record carrier 4. The necessary space between lines is achieved by a simultaneous translatory movement P of the cylinder 1. For a given distance between lines, a fixed relationship exists between the rotary movement and the translatory movement. The drive for two movements can be provided by a drive motor 3. For a variation of the distance between lines, either two separate drives for the two movements are required or a modification of the transmission ratio for rotary movement and translatory movement. During one revolution of the cylinder 1, a row of points (in the case of alphanumerical recording) or a line (in the case of facsimile recording) is produced. If the alphanumerical recording is formed from matrix writing having a matrix of 5 × 7 of 7 × 9, 7 and 9 revolutions, respectively, of the cylinder 1 are necessary to form one complete line.

The synchronization pulse for the beginning of the recording of each line of points or line is produced by a slotted disc 7 via a photoelectric scanning device 8

(FIG. 2). This slotted disc 7 is not shown in FIG. 1, and is arranged on the cylinder shaft.

For the record carrier 4 use is made of a thin, insulating foil having a very smooth surface. The back of this foil comprises either an electrically conductive surface layer, or contacts at least partly an electrically conductive liquid. Within the recording area shown in FIG. 2, the electrode needle 2 slides over the surface of the record carrier 4 under a pressure of more than 10 kg/cm². During this movement over the foil, the electrode needle receives controlled electrical pulses, the voltage amplitude of which is smaller than the voltage required for igniting a gas discharge. Measured on air under normal circumstances, this voltage may not exceed approximately 350 volts. The charge density thus applied to the record carrier 4 is directly proportional to the applied voltage, so that a controllable grey tone reproduction can be achieved. In order to compensate for the triboelectric charging between the electrode needle and the record carrier, a corresponding direct voltage can be applied. The record carrier is freely suspended at the recording area, and can thus give way to the rear under the influence of the electrode needle which is pushed down at a comparatively high pressure, without being hampered by a supporting layer. If such a supporting layer is required for some reason, it must be possible for the supporting layer to give way to a considerable extent, so it must be constructed, for example, in the form of a liquid surface.

At the entrance area of the device the record carrier 4 is pulled through an erase station 9, in which any charge differences existing between the insulated recording surface and the conductive rear are eliminated. After completion of the electrostatic recording, the record carrier 4 is transported further in steps equalling the arc length between the guide rollers 5 and 6. In the exit area, the record carrier 4 passes through a developing station 10, in which the latent charge image is developed in known manner, and is thus made visible. If the distance between lines chosen by way of the translatory movement P of the cylinder 1 corresponds to the width of the recorded track obtained, the erasing station 9 can be dispensed with. This is because a suitable choice of a compensating direct voltage applied to the recording electrode needles 2 can produce complete electrical discharging of the record carrier 4.

Because of the rotary movement P' of the cylinder 1, an overpressure ΔP is built up between cylinder 1 and record carrier 4 (FIG. 3). Due to this pressure, the record carrier 4 is lifted off the cylinder surface by a constant amount $a$ at the recording area. This is necessary for the recording surface of the carrier to be contacted only by the electrode needle 2. The contact pressure Pa of the electrode needle 2 on the record carrier 4 can be laid down by way of the constant tensile force T so as to obtain defined sliding of the electrode needle 2 over the record carrier surface. This method of free suspension prevents damage to the record carrier 4 by the electrode needle 2.

For alphanumerical recording, recordings having point sequence frequencies of up to 2 MHz can be obtained by means of the described device. The limits of application are imposed by the mechanical construction and by the maximum frequency of the electrical amplifier for controlling the needle. The physical recording limit is not reached. The point sequence frequency is dependent on the circumferential speed of the cylinder and of the point dimensions.

A higher recording speed at the same number of revolutions and the same point sequence frequency can be achieved by arranging a plurality of electrode needles 2 on a helix on the cylinder 1. As a result, during one revolution of the cylinder as many lines are then recorded as there are electrode needles.

For each electrode needle 2 a synchronization signal is generated for starting the recording. If more pulses are required during one revolution of the slotted disc 7, problems arise because of the deviations which occur during the manufacture of a disc having a plurality of slots 11; in order to obtain very accurate synchronisations, it was found to be useful to arrange several scanning devices 8 on the circumference of a disc 7 having only one slot 11, the said scanning devices 8 being independently adjustable.

FIG. 4 shows a device in which the scanning location can be readjusted using very simple mechanical means, i.e. such that only a small variation of the scanning location occurs in reaction to comparatively large shifts of the scanning devices 8.

For very accurate synchronizations, in which the synchronization pulse must be given with an accuracy of a few seconds of angle or $\mu$m, the scanning device is arranged to be radially slidable, that is to say perpendicular to the movement direction of the slot 11. The slot 11 of the disc 7 (or of the plate 12 in FIG. 5 for translatory movements) or the scanning device 8 itself is arranged at an angle (angle $\gamma$) with respect to the centre of rotation, so that shifting of the scanning device 8 causes only a small variation of the synchronization point. For example, a slot angle $\gamma = 1°$ and a shift P'' of the scanning device 8 of 0.2 mm, result in a shift of the image point of $$0.2 \text{ mm} \cdot \tan 1° = 3.5 \ \mu\text{m}.$$

A shift of the scanning device 8 in the direction of the movement of the slot 11 by this amount could be realized only with difficulty.

During microrecording according to the described method it is, moreover, possible to make a number of duplicates at the same time, independent of the number of electrode needles 2; this is applicable to alphanumerical as well as facsimile recording. The cylinder 1 is then segment-wise enveloped by different record carriers 4 (for example, by four record carriers in FIG. 6). The electrode needles 2 then simultaneously receive the same information signal.

When the individual electrode needles 2 are actuated by sliding contacts 13 for the individual recording segments 14, it is furthermore possible to make microrecordings of different type in the recording areas I ... IV simultaneously by way of the added information sources $I_1 \ldots I_4$. The electrode needles 2 are then in electrical contact with the associated recording segments 14.

What is claimed is:

1. A method for electrostatically printing characters which comprises:
    providing a record carrier;
    providing an electrode which is constructed as a needle having an area of contact dimensioned for forming a predetermined track width on the record carrier;
    sliding the electrode against the record carrier under a pressure sufficient to deflect the surface of said record carrier, said sliding step providing no support for the record carrier on the side remote from said electrode and in the immediate region of each of said electrodes;

applying selectively controllable pulses during sliding movement between said electrode and said record carrier;

whereby the area of contact between said record carrier and said electrode determines the width of a recorded track and the charge density applied to said record carrier is linearly dependent on the voltage applied to said electrode.

2. A method as claimed in claim 1 wherein said record carrier is made of a foil having one face having a very smooth surface and the side disposed remote from said electrode is electrically conductive.

3. A method as described in claim 2 wherein a DC voltage is applied to said electrode.

4. A method as described in claim 1 wherein said electrode is carried on a drum mounted on an axis and said drum is selectively movable axially and rotationally.

5. A method as described in claim 1 further including the step of applying a dc voltage to said needle which causes a charge density on said record carrier that is equal to and of opposite sign to the triboelectric charge density caused by the record carrier sliding over said needle.

6. Apparatus for electrostatically printing characters on an associated record carrier which comprises:

a drum carried on an axis for selective axial and rotational movement having at least one needle shaped electrode extending from the circumferential face thereof and means for holding the associated record carrier against an arcuate section of the circumferential face of said drum without any support for said record carrier on the side remote from said electrode and in the region of each of said electrodes.

7. The apparatus as described in claim 6 wherein a plurality of additional electrodes are provided on the circumference of said drum.

8. Apparatus as described in claim 6 wherein said arcuate section of the circumferential portion of said drum has an included angle of no more than 80°.

9. Apparatus as described in claim 6 further including a plurality of additional associated record carriers and additional means for holding said record carriers against arcuate sections of the circumferential portion of said drum.

10. The apparatus as described in claim 6 wherein means are provided for applying controllable pulses to said electrode and for synchronizing the actuation of said electrode with the rotary movement of the cylinder, said means for synchronizing including an optically scannable slotted disc and a radially slidable scanning device.

* * * * *